(12) United States Patent
Lawrence et al.

(10) Patent No.: US 6,692,358 B2
(45) Date of Patent: Feb. 17, 2004

(54) INTERACTIVE TELEVISION SYSTEM AND REMOTE CONTROL UNIT

(75) Inventors: Lee G. Lawrence, Denver, CO (US); J. Clarke Stevens, Broomfield, CO (US)

(73) Assignee: Mediaone Group, Inc., Englewood, CO (US)

( * ) Notice: Subject to any disclaimer, the term of this patent is extended or adjusted under 35 U.S.C. 154(b) by 247 days.

(21) Appl. No.: 09/885,771

(22) Filed: Jun. 20, 2001

(65) Prior Publication Data

US 2001/0034269 A1 Oct. 25, 2001

Related U.S. Application Data

(62) Division of application No. 09/412,871, filed on Oct. 5, 1999, now Pat. No. 6,264,559.

(51) Int. Cl.[7] ................................................ A63F 13/00
(52) U.S. Cl. ............................ 463/39; 463/40; 348/734
(58) Field of Search ........................... 463/1, 9, 12–13, 463/36, 39–40, 41, 42–44; 348/552, 734; 700/91, 92; 340/825, 825.72; 455/3.05, 3.06, 3.03; 725/37–38

(56) References Cited

U.S. PATENT DOCUMENTS

| 4,592,546 | A | 6/1986 | Fascenda et al. |
|---|---|---|---|
| 5,213,337 | A | 5/1993 | Sherman |
| 5,343,239 | A | 8/1994 | Lappington et al. |
| D350,962 | S | 9/1994 | Reardon et al. |
| D351,381 | S | 10/1994 | Reardon et al. |
| D357,685 | S | 4/1995 | Reardon et al. |
| 5,519,433 | A | 5/1996 | Lappington et al. |
| 5,526,035 | A | 6/1996 | Lappington et al. |

Primary Examiner—Mark Sager
(74) Attorney, Agent, or Firm—Brooks Kushman P.C.

(57) ABSTRACT

An interactive television system includes a remote control unit and a set top box. The remote control unit includes an input device and control logic. The control logic processes input signals to transmit television control signals to control television programming. Further, the control logic is configured to execute game software instructions stored on a local medium, and process input signals to play the game. In some embodiments, the set top box interacts with the remote control unit during gaming.

7 Claims, 3 Drawing Sheets

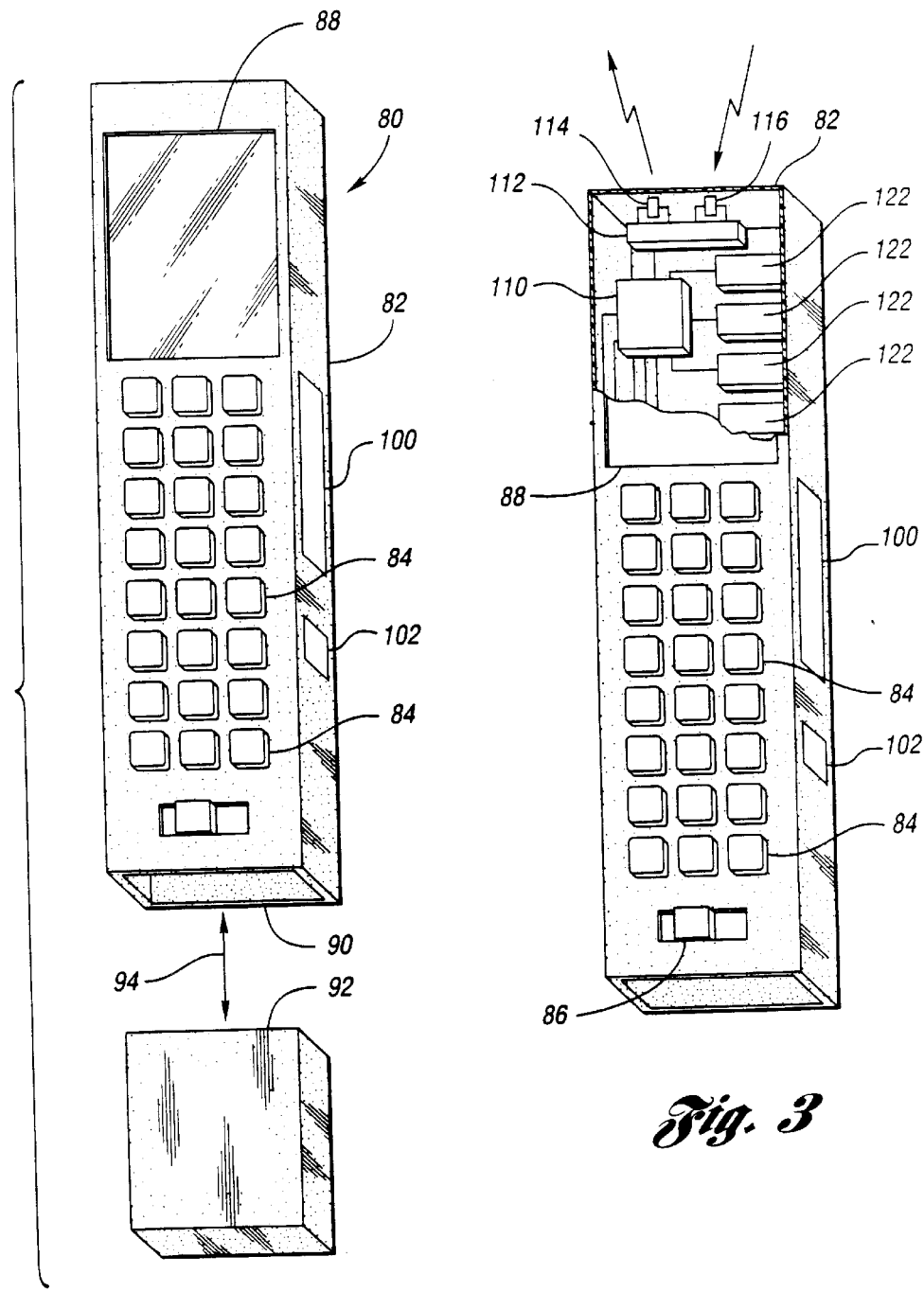

INTERACTIVE TELEVISION SYSTEM AND REMOTE CONTROL UNIT

CROSS-REFERENCE TO RELATED APPLICATIONS

This application is a divisional of application Ser. No. 09/412,871 filed on Oct. 5, 1999, now U.S. Pat. No. 6,264,559.

TECHNICAL FIELD

The present invention relates to television remote control units and interactive television systems.

BACKGROUND ART

Generally, the back of a television set has an input connector to which a transmission line is connected. The transmission line carries all of the programming information. For example, the connector on the back of a television set may be connected to a television antenna, or even to a satellite dish. Sometimes, the connector on the back of the television is connected to a set top box, and the set top box is, in turn, connected to an incoming signal source.

Generally, a set top box is not employed when the incoming signals are received with a conventional television antenna. On the other hand, some televisions, known as cable ready televisions, do not need a set top box and can connect directly to the coaxial cable from the cable company. In the long run, one way or another, many channels reach a television set, and the viewer either uses controls on the set top box or controls on the television set to select a desired channel. Sometimes, a video tape recorder is also connected somewhere along with the other television equipment. Still further, many times these arrangements are confusing and require that the viewer fiddle with controls on multiple devices such as the set top box, television, and video tape recorder, to get the desired channel.

To complicate matters further, sometimes each device has its own remote control. Sometimes, to avoid the viewer facing a plethora of remote controls, a universal remote control is supplied. The universal remote control is configured to communicate with all devices. Some universal remote controls can be configured to control other devices, such as stereo equipment, in addition to the television equipment.

Nevertheless, although there have been many advances in the different ways to bring greater and greater numbers of channels to the viewer, with traditional over-the-air broadcast, with cable distribution, and even with satellite distribution, and although there have been attempts to make controlling all the equipment easier for the end user, there is still a desire to enhance the overall television watching experience for the end user. That is, although it is desirable to continue to provide the end viewer with more and more channels to choose from, it is also desirable to enhance the viewing experience in other ways.

For the foregoing reasons, there is a need for an improved interactive television system that enhances the overall experience for the end user.

DISCLOSURE OF INVENTION

It is, therefore, an object of the present invention to provide an interactive television system including a remote control unit with control logic configured to execute game software instructions stored in a local medium and process input signals received from the input device to play the game software, in addition to the normal functions of the remote control unit, to enhance the overall television viewing experience for the viewer.

In carrying out the above object, an interactive television system is provided. The system comprises a remote control unit and a set top box. The remote control unit is for controlling a television set and for playing interactive video games. The unit includes an input device, a transmitter, a receiver, a medium storing game software, and control logic. The transmitter is for transmitting television control signals and for transmitting gaming signals. The receiver is for receiving gaming signals. The control logic is configured to process signals received from the input device and the receiver, and to execute the game software. The control logic is further configured to cause the transmitter to transmit television control signals and gaming signals to control the television and play the game software.

The set top box is connected to the television and in two-way communication with a programming network. The set top box includes a receiver for receiving television control signals and gaming signals from the remote control unit. Further, the set top box includes a transmitter for transmitting gaming signals to the remote control unit. Still further, the set top box includes control logic configured to process television control signals and control programming on the television and to process gaming signals and communicate game information over the network to allow network gaming using the remote control.

The remote control unit and the set top box may communicate in a number of different ways, and in one embodiment, the set top box and remote control unit communicate within the infrared frequency spectrum. In one implementation, the remote control unit control logic is configured to download game software from the set top box and store the software in a remote control medium. In another embodiment, the remote control unit medium is a removable game card to allow the remote control unit to receive different game cards.

Preferably, the remote control unit is configured with at least one expansion port. One type of expansion port that is desirable is an expansion port configured to accept the memory module. Another type of expansion port that is desirable is an expansion port configured as an expandable bus, such as a universal serial bus (USB).

In one implementation, the set top box is configured to transmit gaming signals to the remote control unit that are based on the television programming such that the gaming is related to the television programming. In an alternative, the gaming is not related to the television program.

In some implementations, the remote control unit further comprises a display. The remote control unit control logic is further configured to provide a game view on the display. Further, in such an embodiment, the set top box control logic is preferably further configured to provide a group game view on the television, with the remote control game view being an individual game display to allow multi-player network gaming in which each player has an individual view in addition to the group view available to all players. In the alternative, both the individual game view and the group game view may be provided on a television, with the remote control unit not needing a display. For example, a split screen or a windowing technique may be used.

Further, in carrying out the present invention, a television remote control unit is provided. The remote control unit comprises a body, an input device on the body, and control logic. The control logic is configured to process input signals received from the input device. The control logic is further configured to transmit television control signals in accordance with the input signals to control programming on the television. Still further, the control logic is configured to execute game software instructions stored in a local medium and process input signals received from the input device to play the game software.

Advantageously, game playing with the remote control device with a screen that is either on the remote control, on the television, or with screens on both devices, advantageously enhances the overall viewing experience for the end user. For example, although some viewers have a tendency to surf the available channels when a particular program becomes dull, a viewer may desire to temporarily ignore the television program and play a video game with the remote control. The embodiments of the present invention take advantage of the fact that most home viewers already have a remote control, such that a remote control of the present invention may simply be used in place of an existing remote control. As such, the end viewer does not need any additional device, because a remote control is something that most viewers already have.

For example, some viewers may be interested in the video gaming concept, but not be interested enough to go out and purchase an entire home video game system for several hundreds of dollars or a high performance computer system usually well over one thousand dollars in cost. On the other hand, the implementation of simple games, playable with the remote control, which a viewer already has, may be very appealable to the end viewer with gaming interests, but not having such a high level of interest to want an entire dedicated gaming system.

The above object and other objects, features and advantages of the present invention are readily apparent from the following detailed description of the best mode for carrying out the invention when taken in connection with the accompanying drawings.

BRIEF DESCRIPTION OF DRAWINGS

FIG. 2 is a television remote control unit of the present invention, shown in an embodiment having a removable game cartridge;

FIG. 3 is a partially cut away view of the remote control unit shown in FIG. 2.

BEST MODE FOR CARRYING OUT THE INVENTION

Figure 1:
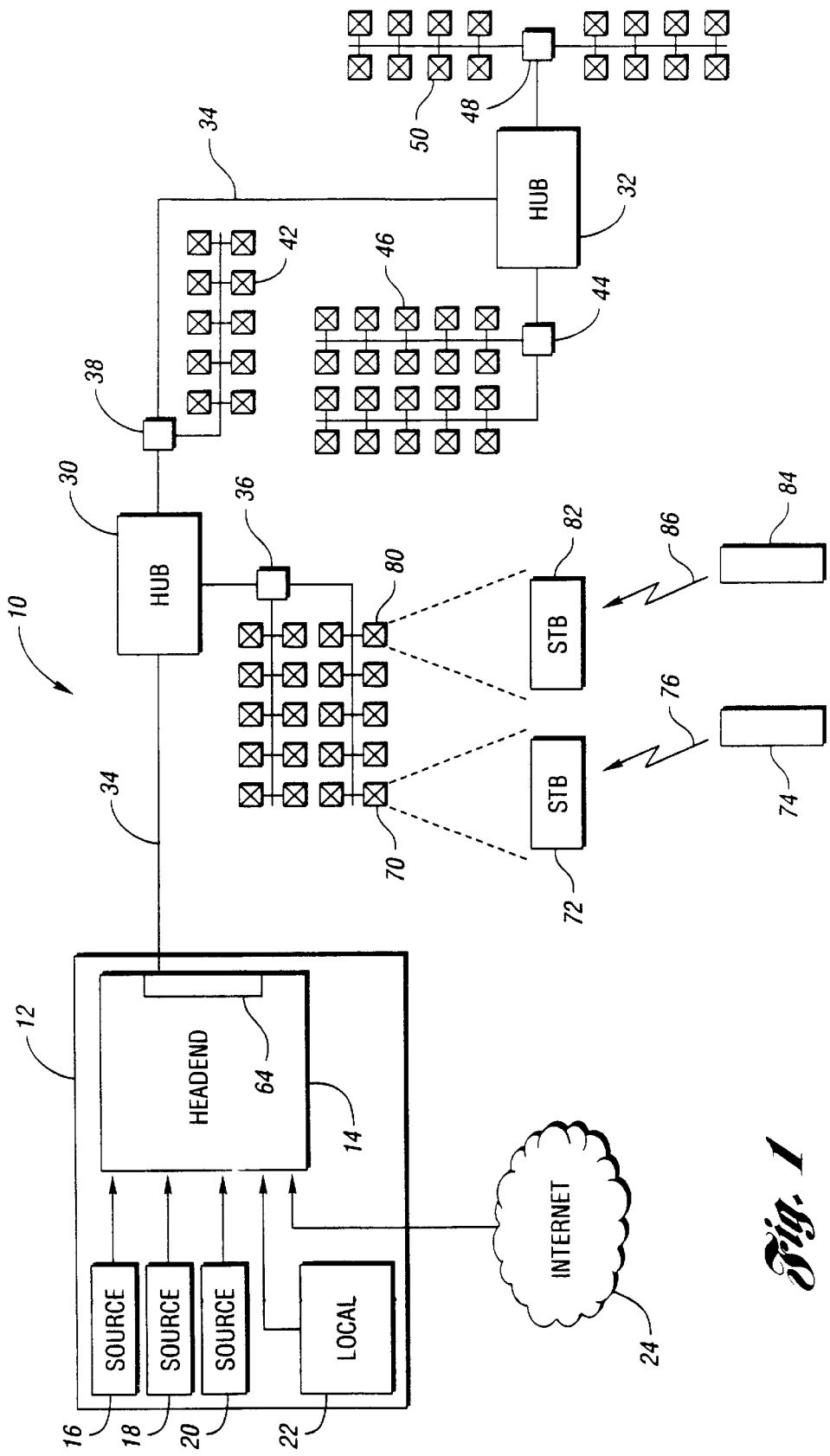
FIG. 1 illustrates a cable distribution system, showing the distribution of programming from a central office to the end user's set top box, and shows a remote control of the present invention near the set top box.

With reference to FIG. 1, a system of the present invention and a suitable network environment are generally indicated at 10. System 10 includes a central office 12. A head end 14 is located at central office 12. Of course, depending on the size of the service area, it may be desirable to provide additional head ends. For example, some large cities have two head ends providing service. Head end 14 receives programming information from a variety of sources such as satellite dishes along a satellite dish bar, antennas, and land line communication paths. That is, information is received by head end 14 from, for example, sources 16, 18, 20.

Further, local programming is received from a local programming source 22. Because some cable companies desire to provide Internet services, head end 14 may also receive information from the Internet 24. Preferably, two-way communication is possible between head end 14 and the end viewer so that game information may be communicated over the network to allow network gaming using the remote control.

The simplified version of system architecture is illustrated herein for convenience. Head end 14 distributes programming information to a plurality of hubs 30, 32. Preferably, distribution to the hub 30, 32, takes place over fiber 34. Hubs 30, 32 distribute programming information to a plurality of nodes. Nodes are generally located in each neighborhood that is serviced. As shown, hub 30 distributes to nodes 36 and 38. Optoelectric conversion takes place at node 36, and the signals are then distributed over coax to serve a number of customer residences 40. Node 38 distributes signals over coax to customer residences 42. That is, a suitable network for embodiments of the present invention may be an existing cable television network, or an upgraded network. Of course, it is appreciated that system 10 is illustrated for convenience, and embodiments of the present invention are not limited to any particular network architecture and may be readily implemented over a cable television network as well as over the Internet, or even via satellite.

The network illustrated is a hybrid fiber coax (HFC) network implementation. A hyper fiber coax (HFC) network is a network in which fiber is distributed from a central office to hubs, the fiber continuing to nodes in the neighborhood, and then the last leg of the communication path is performed over coax. By using coax for the last leg of a communication path, the existing coax drops in many neighborhoods may be utilized and the expense of laying new wirelines in the neighborhood may be saved.

With continuing reference to FIG. 1, central office 12 serves hubs 30 and 32 serving customer residences 40, 42, and 46, 50, respectively. Customer residences 46 and 50 are served by network nodes 44 and 48, respectively. In accordance with the preferred embodiments of the present invention, control logic 64, suitably located at head end 14, is programmed to communicate and control game information over the network to allow network gaming using the remote control. In alternative embodiments, the video games in the remote control unit may stand alone.

With continuing reference to FIG. 1, to better illustrate multi-player gaming using remote control units, additional detail is shown at residences 70 and 80. Resident 70 has a set top box 72 that communicates with a remote control unit 74, as indicated by arrow 76. Resident 80 has a set top box 82 that communicates with remote control unit 84 as indicated by arrow 86. In some implementations of the present invention, the remote control units are configured for controlling the television set and for playing interactive video games. Control logic within the remote control unit processes signals received from input devices on the unit and from a receiver on the unit. Further, the control logic executes the game software (which may be stored on a removable medium, such as a cartridge or may be received from the set top box and stored on a non-removable medium, and so on).

In use, the remote control unit can be used to transmit television control signals to control the television, and can be used to transmit gaming signals to play the game software. In the multi-player implementation, the set top box includes control logic that processes the television control signals to control programming on the television, and processes the gaming signals to communicate game information over the network to allow network gaming using a remote control unit. In an alternative implementation, the set top box does not need to communicate gaming information over the network, and the games are individual games for the particular viewers. That is, an advantage of the present invention is the added capability of gaming with the remote control unit, which enhances the overall viewing experience. A further advantage, in some implementations of the present invention, is that the gaming information is transmitted from the remote control, received by the set top box, and a portion of that information is transmitted over the network to allow multi-played gaming or gaming that interacts with the television programming.

With reference to FIG. 2, a remote control unit of the present invention is generally indicated at 80. Remote control unit 80 includes a body 82, and a plurality of keys 84. Of course, the input devices on the remote control unit are not limited to keys only. But it is appreciated that some users are more familiar with a traditional remote control, and would prefer the use of a keypad made up of keys 84 for playing games. The remote control unit may be given a sufficiently large number of keys such that some of the keys are used for controlling the television, while other keys are used for playing games. On the other hand, a selector switch 86 may be provided so that the user can switch the functions of the keys from game playing to television controlling, as desired.

Preferred remote control units made in accordance with the present invention include a display 88, such as an active matrix liquid crystal display, but a display is not required, and the television (or a portion of the television screen) may be used for game playing in the alternative. Further, the game software may be implemented as a removable medium 92 received in a slot 90, as indicated by arrow 94. On the other hand, when a remote control unit is provided with a receiver, the gaming software may be downloaded to the remote control unit instead of pre-recorded on a removable storage medium. Still further, games may be downloaded and stored on removable storage media, and other arrangements may also be provided as is appreciated by those skilled in the electronic arts.

In preferred embodiments, the remote control unit 82 is provided with at least one expansion port. For example, expansion port 100 is configured to receive a memory module so that additional memory may be added to the remote control unit to increase gaming performance (and also to possibly increase functionality as a television controller). Further, a bus connector 102 may be provided. Connector 102 may be configured for a universal serial bus (USB), or for any other type of device connector, such as a serial and parallel port.

As best shown in FIG. 3, an upper portion of the remote control unit 82 is cut away to reveal an exemplary system block diagram of the control logic and associated items inside unit 82. In the example illustrated, the main portion of the control logic is implemented as a microprocessor 110. Input/output control logic 112 connects to microprocessor 110 and to a transmitter 114 and a receiver 116. Further, memory is indicated at 122.

In one implementation, transmitter 114 is controlled to transmit television control signals and transmit gaming signals. Receiver 116 is controlled to receive gaming signals. Game software is stored in a medium such as game card 92, memory chips 122, or any other known storage medium or media. Microprocessor 110 performs the control logic functions and processes signals received at receiver 116 and signals from input devices, such as keys 84 or anything connected to an expansion port. The set top box, in response to transmissions from the remote control unit, controls television programming and communicates gaming information over the network to allow network gaming using the remote control. In another embodiment, the gaming is not networked, and the transmitter on a remote control unit may not be needed.

Of course, although infrared frequency communication is suitable for remote controls and set top boxes, other types of communication may be used in the alternative. Further, networking embodiments of the present invention may relate the gaming to the television programming, such an implementation may employ control logic 64 (FIG. 1) at the head end.

Figure 4:
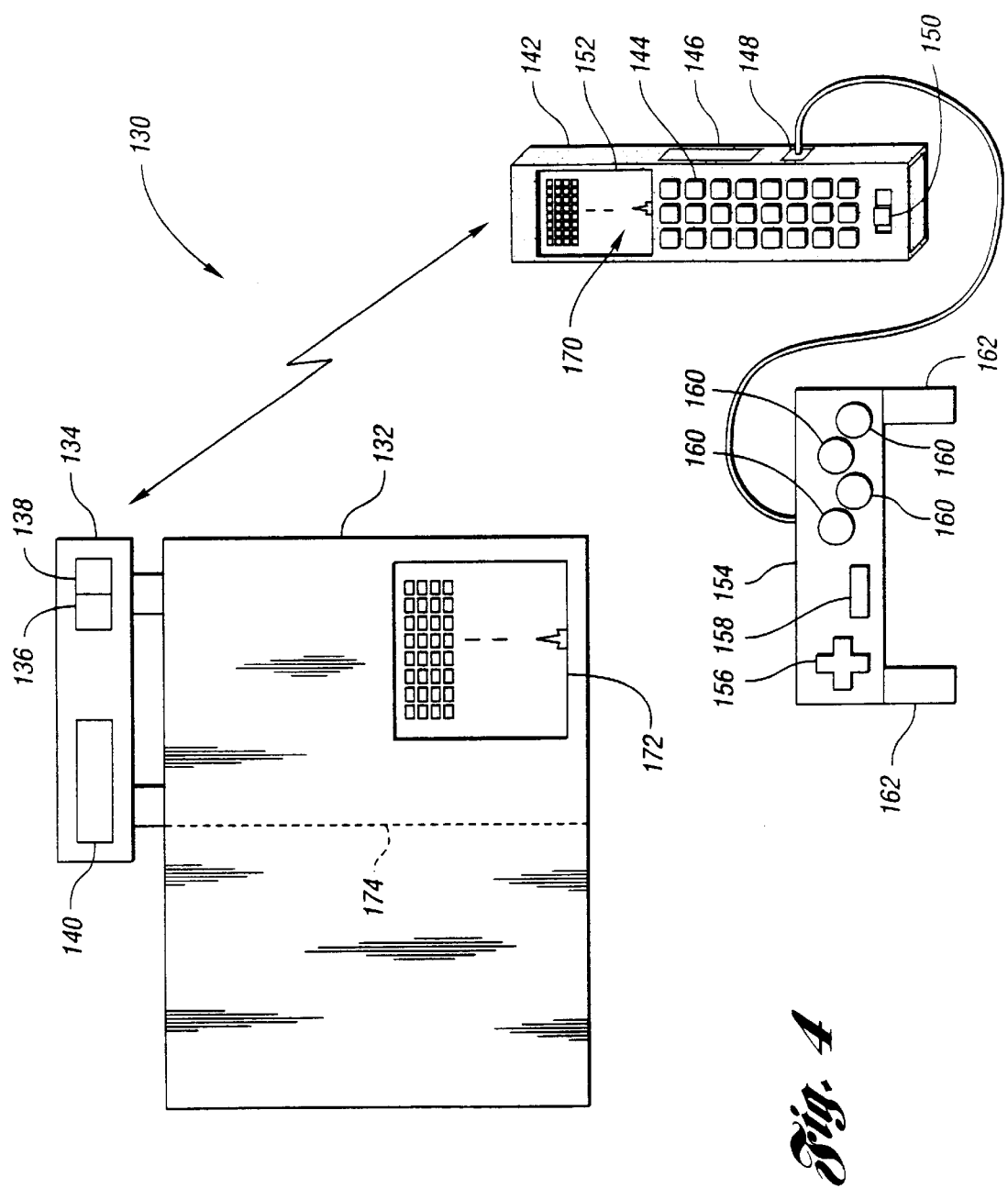
FIG. 4 illustrates a television, set top box, remote control unit, and optional game pad arranged in accordance with the present invention.

With reference to FIG. 4, an implementation of the present invention at the viewer location is generally indicated at 130. A television 132 is connected to a set top box 134 that receives signals from a programming source. Transmitter 136, receiver 138 and set top box 134 are used to communicate with the remote control unit. Set top box 134 may be provided with a display 140 to show the currently selected channel or other information. Remote control unit 142 has keypad buttons 144, expansion slot 146, and connector 148 that is used for a gaming controller. As mentioned previously, some implementations may utilize a selector switch 150 to determine the function of the keyboard. As shown, remote control unit 142 has a display 152 for displaying a video game. Controller 154 has a directional controller 156, a plurality of pushbuttons 158 and 160, and handles 162. As shown, the video game is generally indicated at 170 on display 152 of remote control unit 142. In the alternative, the video game display may be shown in a window 172 on television 132. As such, some embodiments of the remote control unit may omit the display screen. Further, in the alternative, other techniques may be utilized for displaying the video game such as a split screen along dashed line 174.

As mentioned previously, many arrangements may be made for displaying the video game and the television programming. For example, the video game may be displayed on the remote control unit. Alternatively, the video game may be displayed on the entire TV screen, on a portion of the TV screen, or in a window on the TV screen. Further, an individual view of the game may be displayed on the remote control unit, while a group view of the game (in a configuration that allows network gaming) is displayed on the television (possibly in a window, or as full screen). Some embodiments of the present invention make the video game interactive with a television program. For example, trivia games may interact with a broadcast trivia game on the television so that the home viewer can keep his own score along with the contestants on a television. On the other hand, games such as this may be individual or networked so that the home viewer can compete with other home viewers.

It is appreciated that embodiments of the present invention provide video games in the remote control unit to enhance the overall viewing experience of the end viewer. For example, individual games, and network games, are provided in accordance with the present invention. Embodiments of the present invention may be enjoyed by the end viewer, for example, during commercials. In some implementations, game cards could be removably inserted into the remote, or a method for the viewer to download games to the remote from the set top box can be provided.

Group games, such as trivia games or card games may be enjoyed by the end viewer while watching television simultaneously to enhance the overall viewing experience.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An television remote control unit comprising:

a body;

in input device on the body;

control logic within the body, the control logic being configured to process input signals received from the input device and to transmit television control signals in accordance with the input signals to control programming on the television, the control logic being further configured to execute game software instructions stored in a local medium received by the body and to process input signals received from the input device to play the game software.

2. The remote control unit of claim 1 wherein the medium is a removable game card to allow the remote control unit to receive different game cards.

3. The remote control unit of claim 1 wherein the medium is a programmable memory and the remote control unit further comprises:

a receiver within the body, wherein the control logic and the receiver are configured to download game software from a set top box and store the software in the memory.

4. The remote control unit of claim 1 further comprising:

at least one expansion port at the body.

5. The remote control unit of claim 4 wherein the at least one expansion port is configured to accept a memory module.

6. The remote control unit of claim 4 wherein the at least one expansion port is configured as an expandable bus.

7. The remote control unit of claim 1 further comprising:

a display at the body, the control logic being further configured to provide a game view on the display.

* * * * *